No. 626,469. Patented June 6, 1899.
J. H. TAYLOR.
DEVICE FOR SPRAYING PLANTS, &c.
(Application filed Feb. 28, 1898.)
(No Model.)
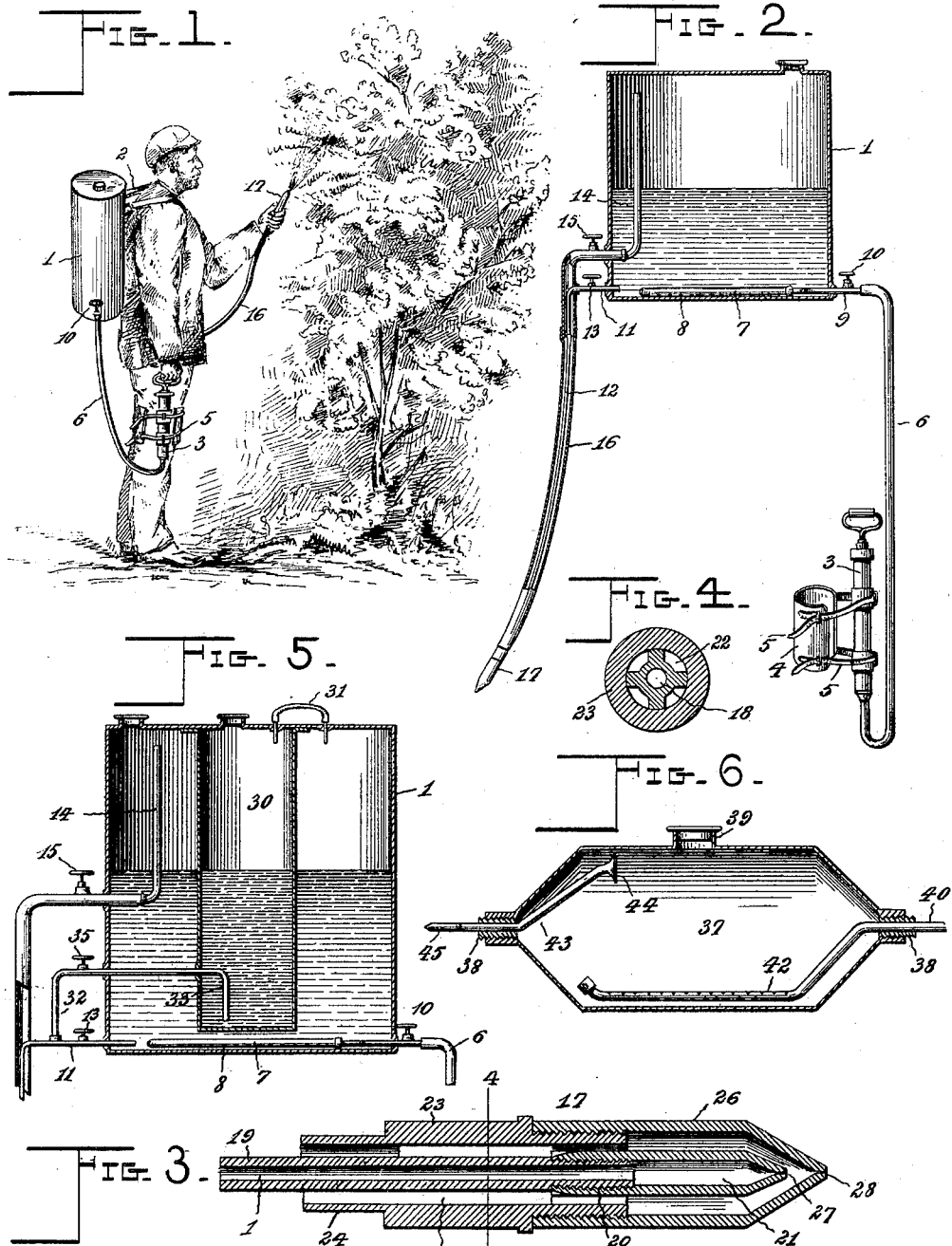
Witnesses
John F. Deufferwiel
H. F. Benchord
Joe H. Taylor, Inventor
By his Attorneys,
C. A. Snow & Co.

United States Patent Office.

JOSEPH H. TAYLOR, OF CRAWFORDSVILLE, INDIANA.

DEVICE FOR SPRAYING PLANTS, &c.

SPECIFICATION forming part of Letters Patent No. 626,469, dated June 6, 1899.

Application filed February 28, 1898. Serial No. 672,024. (No model.)

*To all whom it may concern:*

Be it known that I, JOSEPH H. TAYLOR, a citizen of the United States, residing at Crawfordsville, in the county of Montgomery and State of Indiana, have invented a new and useful Device for Spraying Plants, &c., of which the following is a specification.

My invention relates to improvements in devices for spraying trees, plants, shrubbery, and the like with an insecticide, either a poisonous liquid mixture or a dry powder; and one object of the invention is to provide a simple structure which may be conveniently carried by the operator and manipulated to direct the insecticide upon any part of a tree or plant.

A further object that I have in view is to provide means for charging a vessel with compressed air for the purpose of forcing liquid from a tank and for atomizing the insecticide when it is desired to spray the latter over a plant.

A further object of the invention is to provide means by which a dry powdered insecticide may be ejected or thrown by the apparatus when it is not desired to spray the plants with a poisonous liquid mixture.

With these ends in view the invention consists in the novel combination of elements and in the construction of parts, which will be hereinafter fully described and claimed.

To enable others to understand my invention, I have illustrated the preferred embodiment thereof in the accompanying drawings, forming a part of this specification, and in which—

Figure 1 is a view illustrating the spraying apparatus in position on the operator. Fig. 2 is an enlarged vertical sectional view through the reservoir. Fig. 3 is an enlarged longitudinal sectional view through the spray-nozzle. Fig. 4 is a transverse sectional view through the nozzle on the plane indicated by the dotted line 4 4 of Fig. 3. Fig. 5 is a vertical sectional view illustrating another construction of the reservoir in which I employ a tank for containing a poisonous liquid, such as kerosene-oil. Fig. 6 is a vertical sectional view of a preferred construction of the distributer for the dry powdered insecticide which is adapted to be used in connection with the air under pressure from the reservoir.

Like numerals of reference denote like and corresponding parts in each of the several figures of the drawings.

According to my invention I employ the reservoir 1, which is of suitable size and capacity to contain a proper quantity of the poisonous liquid which it is desired to spray over trees, plants, and the like. This reservoir may be constructed of sheet metal or any other suitable material and of proper size and shape. To the shell of the reservoir are attached the straps 2, adapted to be passed around the shoulders of the operator for the purpose of conveniently carrying the reservoir around an orchard or garden. This reservoir is designed to be partially filled with the liquid which is to be sprayed, so that the upper part of said reservoir forms an air-chamber, into which air may be forced so as to exert pressure upon the liquid in the lower part of chamber of the reservoir and to maintain therein a reserve supply of compressed air which may be drawn upon for the purpose of atomizing the liquid at the delivery-nozzle when the apparatus is in use. This reservoir is provided with a suitable filling-nozzle adapted to be closed by a suitable cap or cover, and said reservoir may be equipped with any other device which tends to promote its convenience.

3 designates the air-pump, by which the air may be compressed and forced into the reservoir to maintain the desired pressure therein. This air-pump may be of any suitable or preferred construction known to those skilled in the art, and for the convenience of the operator I provide said pump with means whereby it may be clamped or held in a fixed position on one of the operator's legs, so that one hand may be employed to manipulate the pump-piston while the other hand grasps and manipulates the distributing-nozzle. A clamp 4 is adapted to be passed around the leg, and it is attached by the straps 5 to the cylinder of the pump 3, so that the straps may be adjusted to draw the clamp 4 and the pump tightly in place. To the delivery end of the pump-cylinder is connected one end of a flexible hose 6, which leads upwardly from the pump to the lower part of the reservoir 1. In the bottom of this reservoir is arranged a doubled or coiled delivery-pipe 7, one end of which protrudes through the reservoir-shell to form a nipple 9. To this protruding nipple is attached the upper end of the air-hose 6, and in said nipple is fitted a valve 10, which may be adjusted to cut off communication between the hose 6 and pump 3 with the reservoir. The doubled or coiled length of pipe 7 in the bottom part of the reservoir is provided in its lower side with the exit ports or openings 8, which open downwardly into the liquid contained in the lower part of said reservoir, whereby the air under pressure from the pump is discharged downwardly toward the bottom of the reservoir and is caused to pass upwardly through the liquid in said reservoir for the purpose of agitating the liquid and preventing the poisonous ingredient or element thereof from settling or precipitating upon the inlet-pipe 7 and the bottom of the reservoir. The air after passing through and agitating the liquid contents of the reservoir accumulates in the air-space of said reservoir above the level of the liquid therein, and air under pressure is thus contained in the reservoir to force the liquid therefrom and to supply the distributing-nozzle with a sufficient quantity of air necessary to atomize the liquid or to distribute the dry insecticide.

The liquid-outlet pipe is indicated at 11 as being connected to the lower part of the reservoir-shell, so as to communicate with the reservoir-chamber at a point just above the bottom thereof, and to the free depending end of this outlet-pipe 11 is fitted or attached one end of the liquid-hose 12. In said outlet-pipe 11 for the liquid is seated a valve 13, which may be closed to cut off communication between the reservoir and the hose 12, or said valve may be opened to the desired extent for the liquid to pass from the tank and pipe 11 into the hose to be supplied to the distributing-nozzle.

The air-outlet pipe 14 is attached to the reservoir-shell to have its lower end protrude therefrom and inclose a part of the exposed length of the liquid-outlet pipe 11, while the other end of said air-pipe 14 terminates within the reservoir, near the head thereof, to permit the air from the upper air-space of the reservoir to pass into the pipe 14 without obstruction. This air-pipe 14 is also equipped with a cut-off valve 15, which is readily accessible, so as to be adjusted independently of the valve 13 in the liquid-pipe. To the free end of the air-pipe 14 is attached a hose 16, which is larger in diameter than the liquid-hose 12 and is adapted to inclose the latter within itself without, however, obstructing the free passage of air through the hose 16 from the air-pipe 14 to the distributing-nozzle 17. This distributing-nozzle is of peculiar construction to enable it to be attached to the extremities of both the liquid and air hose 12 16, respectively, and the liquid and air under pressure pass through this nozzle until they arrive at the point of discharge from said nozzle. The liquid is injected from the isolated liquid passage or duct into the stream or current of air flowing through the distributing-nozzle, such injection taking place at the delivery-tip of the nozzle for the purpose of breaking the liquid up into a spray and throwing the spray a considerable distance from the nozzle and upon the tree or other vegetable growth which it is desired to spray with the poisonous insecticide. The detailed construction of the preferred form of the distributing-nozzle for a liquid or a poisonous solution is represented by Figs. 3 and 4 of the drawings. Said nozzle has an interior liquid-tube 18, which is reduced at its opposite ends, one of said reduced ends at the receiving end of the liquid-tube forming a nipple 19, over which the liquid-hose 12 may be tightly fitted. The other reduced end of the liquid-tube 18 is externally threaded, as at 20, to receive a conical tip 21. The central enlarged part of the liquid-tube 18 is provided externally with a series of longitudinal channels or ducts 22, which form the air-passages between the internal liquid-tube and the external sleeve 23. This external sleeve is forced tightly over the channeled or grooved body of the liquid-tube to fit tightly thereon, but to be free from contact with the hose-attaching nipple 19 and the conical tip 21 of said internal tube. This external sleeve may be attached rigidly to the internal tube in any suitable way, and at its heel or rear end the sleeve is provided with a reduced nipple 24 to receive the extremity of the air-hose 16. The other reduced end of the external sleeve is threaded exteriorly to receive the delivery-tip 26 of the nozzle, and from the described construction it is apparent that the air under pressure from the hose 16 is delivered from the external sleeve to pass through the longitudinal channels or ducts 22 in the internal sleeve and thence delivered into the annular space between the tips 21 and 26 of the distributing-nozzle. The tip 21 of the internal tube is in central relation to and concentric with the tip 26 of the air-sleeve 23, and said inner tip 21 has an axial port 27 at its apex or extremity and at a suitable distance in rear of a similar port 28 in the tip 26 of the external sleeve. The air under pressure is delivered from the hose 16 to the external sleeve and the tip, while the liquid, also under pressure, is conveyed by the hose 12 and the internal tube 18 to the inner tip 21. The liquid is injected by the tip 21 into the current or stream of compressed air at the delivery end of the nozzle, and the liquid is thus atomized previous to or as it emerges from the axial port 28 of the distributing-nozzle. As the liquid and air are delivered under pressure from the storage-reservoir the poisonous spray is ejected from the delivery-nozzle, so that it may be thrown to good advantage upon trees or shrubbery while the operator is standing upon the ground.

The operation of my invention as thus far described may be stated as follows: The poisonous ingredient or ingredients are placed with a suitable quantity of water in the reservoir 1, and the reservoir is strapped to the shoulders of the operator, while the air-pump is attached to one of his legs. The pump is operated to force air through the hose 6 into the delivery-pipe 7, from whence the air is discharged downwardly toward the bottom of the reservoir and caused to rise through the liquid therein, thus keeping the liquid in an agitated condition as long as the pump is operated. The valves having been opened in the outlet-pipes for the liquid and air, the liquid passes through the pipe 11 and the hose 12 to the internal tube 18 of the distributing-nozzle, while the air passes through the pipe 14 and hose 16 to the external tube or sleeve 23 of said nozzle. The liquid is atomized by the current of air and emerges from the nozzle in the form of a fine mist or spray, and the nozzle may be manipulated or directed by hand to throw the spray upon the tree or shrubbery. As long as the apparatus is in service it is necessary for the operator to reciprocate the pump-piston to force air into the reservoir to maintain therein a sufficient pressure to force the liquid to the nozzle and insure a large supply of air to the nozzle to vaporize the liquid and project the spray from the nozzle upon the plant.

In Fig. 5 of the drawings I have shown the reservoir as equipped with a tank 30, adapted to contain a liquid of a poisonous nature to vegetable parasites, such as kerosene, as distinguished from a mixture which may be used in the chamber of the reservoir proper. This tank 30 is designed to be suspended from the head of the reservoir; but it has no direct communication with the chamber thereof. Air-pressure is maintained in this tank by means of an air-tube 31, which is arranged outside of the head of the reservoir to have one end thereof communicate with the air-space in said reservoir and its other end open into the tank 30 above the level of the liquid therein. From the bottom of this tank 30 leads an outlet-pipe 32, the inner end of which has an elbow 33, that terminates above the bottom of the tank 30, while the other end of the pipe 32 is connected to the liquid-pipe 11. In the pipe 32 is provided a valve 35, which may be closed to prevent the liquid contained in the tank 30 from passing through the pipe 32 when it is desired to distribute the poisonous liquid contained in the reservoir 1. In some cases, however, the valve 35 in the pipe 32 may be opened to permit the liquid kerosene or other liquid to pass from the tank 30 through the pipe 32 and thence through the liquid-outlet pipe to commingle with the liquid supplied to the nozzle, thus insuring admixture of the fluids from the tanks 30 and in the desired proportion, because the valves 35 and 13, or either of them, may be adjusted to regulate the quantity of liquid admitted severally to the pipes or jointly to the nozzle. I also provide a distributer which may be used to good advantage in spraying dry powdered insecticide over plants or shrubbery, and in Fig. 6 of the drawings I have illustrated the preferred form of the powder-distributer, which may be used in connection with the reservoir and the pump when the reservoir is free from liquid. This distributer, as shown by Fig. 6, consists of a shell 37, having conical ends and provided with removable caps 38, which permit ready access to the interior of the shell when it is desired to clean the latter from a solid mass of insecticide which may lodge in and obstruct the passage of air through said distributer. The distributer-shell 37 is provided with a suitable filling-nozzle 39, adapted to be closed by a suitable cap or cover, which when removed allows the shell to be filled with the powdered insecticide. Through one of the caps 38 leads an air-inlet pipe 40, which is bent to form the branch 42, that lies close to the bottom of the shell 37, and this branch 42 is perforated throughout its length on its upper and lower sides for the free passage of air from the pipe into the chamber of the shell or magazine 37. Through the other cap 38 of the magazine or shell leads the outlet-pipe 43, the exposed end of which terminates in a nozzle 45, while its inner end is carried upward toward the top part of the shell and is flared or enlarged to form a mouth 44. It will be observed that the outlet-pipe 43 is out of line with and to one side of the perforated branch of the air-inlet pipe, and thus the air under pressure delivered by the pipe 40 is caused to rise through the chamber of the shell or magazine 37 and carry with it the dry powdered insecticide, the air finding free exit through the enlarged mouth 44 and the pipe to the nozzle 45. The described arrangement of the pipes with reference to the magazine or shell obviates the direct passage of air through said magazine, and the outlet-pipe terminates within the shell or magazine to prevent the powdered insecticide from clogging in the shell or the outlet-pipe itself.

I am aware that changes in the form and proportion of parts and in the details of construction may be made by a skilled mechanic without departing from the spirit or sacrificing the advantages of my invention, and I therefore reserve the right to make such modifications as clearly fall within the scope of the invention.

Having thus described the invention, what I claim is—

1. In a portable apparatus for spraying trees and shrubbery, the combination with a reservoir, and means for maintaining atmospheric pressure therein, of a tank situated within said reservoir and communicating with the air-space thereof, an air-outlet pipe leading from the reservoir, a valved outlet-pipe leading from the liquid-space of the reservoir, another valved pipe leading from the tank and connected with said liquid-pipe, a spraying-nozzle, and connections between said nozzle and the liquid and air pipes, substantially as described.

2. In a portable spraying apparatus, a reservoir and a tank carried thereby, combined with pipes communicating with the liquid and air spaces of said reservoir, a valved pipe communicating with the tank and with one of the first-named pipes, and a nozzle connected with said pipes, substantially as described.

3. In a portable spraying apparatus, a reservoir and a liquid-tank supported thereby and communicating with the air-pressure chamber or space of said reservoir, combined with a valved liquid-pipe connected with the liquid-chamber of said reservoir, an air-pressure pipe connected to the air-space of the reservoir, another valved liquid-pipe connected to the internal liquid-tank and to the first-named liquid-pipe, a combining-nozzle connected to the air and liquid pipes, and an air-pump discharging to the reservoir, substantially as described.

4. In a portable spraying apparatus, the combination with a reservoir having shoulder-straps, of an air-pump disconnected from the reservoir and provided with leg-bands adapted to be secured firmly in place on an operator's leg and support the pump in convenient reach, a flexible tube or hose connecting the pump with said reservoir, a combining-nozzle independent of the reservoir, and flexible air and liquid tubes connected to the air and liquid chambers of the reservoir and to the combining-nozzle, whereby the pump may be operated with ease to maintain air-pressure in the tank and the nozzle may be directed freely in any direction, substantially as described.

In testimony that I claim the foregoing as my own I have hereto affixed my signature in the presence of two witnesses.

JOE H. TAYLOR.

Witnesses:
FRANK HALLOWELL,
HARVEY E. WYNEKOOP.